US009384585B2

(12) United States Patent
Kim et al.

(10) Patent No.: US 9,384,585 B2
(45) Date of Patent: Jul. 5, 2016

(54) 3-DIMENSIONAL SHAPE RECONSTRUCTION DEVICE USING DEPTH IMAGE AND COLOR IMAGE AND THE METHOD

(71) Applicant: Electronics and Telecommunications Research Institute, Daejeon (KR)

(72) Inventors: Ho Won Kim, Seoul (KR); Jin Sung Choi, Daejeon (KR); Bon Ki Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 223 days.

(21) Appl. No.: 14/055,257

(22) Filed: Oct. 16, 2013

(65) Prior Publication Data

US 2014/0111507 A1 Apr. 24, 2014

(30) Foreign Application Priority Data

Oct. 23, 2012 (KR) .................. 10-2012-0117998
Jan. 8, 2013 (KR) .................. 10-2013-0001903

(51) Int. Cl.
*G06T 15/08* (2011.01)
*G06T 17/00* (2006.01)
(52) U.S. Cl.
CPC .............. *G06T 15/08* (2013.01); *G06T 17/00* (2013.01); *G06T 2200/08* (2013.01)
(58) Field of Classification Search
CPC ..... G06T 15/08; G06T 7/0022; G06T 7/0051; G06T 7/0059; G06T 7/0065; G06T 7/0071; G06T 7/0075; G06T 17/00; G06T 2200/08
See application file for complete search history.

(56) References Cited

U.S. PATENT DOCUMENTS

| 8,009,867 | B2 | 8/2011 | Mathe et al. | |
|---|---|---|---|---|
| 2010/0034457 | A1* | 2/2010 | Berliner | G06K 9/00362 382/154 |
| 2011/0206282 | A1* | 8/2011 | Aisaka et al. | 382/195 |
| 2011/0211754 | A1* | 9/2011 | Litvak | G06K 9/00375 382/165 |
| 2013/0010079 | A1* | 1/2013 | Zhang et al. | 348/47 |
| 2014/0056471 | A1* | 2/2014 | Gu | G06K 9/00208 382/103 |

FOREIGN PATENT DOCUMENTS

EP 2 239 708 A2 10/2010

OTHER PUBLICATIONS

Ahmed, A System for 360o Acquisition and 3D Animation Reconstruction using Multiple RGB-D Cameras, May 2012, Computer Animation and Social Agents (CASA 2012).*
Cheung, Shape-From-Silhouette Across Time Part II: Applications to Human Modeling and Markerless Motion Tracking, 2005, International Journal of Computer Vision 63(3), 225-245.*
Gvili, Depth keying, 2003, Proceedings of SPIE/IS&T vol. 5006.*

(Continued)

*Primary Examiner* — Ming Hon
*Assistant Examiner* — Phuc Doan (57) ABSTRACT

A 3-dimensional (3D) whole shape reconstruction apparatus using a depth image and a color image and a 3D whole shape reconstruction method are provided. The 3D whole shape reconstruction apparatus may include an information generation unit to generate shape information of 3D portions using a depth image and a color image, and a shape reconstruction unit to reconstruct a 3D whole shape of a user by matching the shape information of 3D portions.

16 Claims, 8 Drawing Sheets

(56) References Cited

OTHER PUBLICATIONS

Hays, Finding Boundary, CS143 Brown Univerity, 2011, url: http://cs.brown.edu/courses/cs143/2011/lectures/10.pdf.*

Dahan, Combining color and depth for enhanced image segmentation and retargeting, Vis Comput (2012) 28:1181-1193.*

Rother, GrabCut—Interactive Foreground Extraction using Iterated Graph Cuts, ACM Trans. Graph. 23(3), 309-314 (2004).*

Reinhard, Depth-of-field-based alpha-matte extraction, APGV '05 Proceedings of the 2nd symposium on Applied perception in graphics and visualization, pp. 95-102.*

Zhang, Calibration Between Depth and Color Sensors for Commodity Depth Cameras, 2011, URL: http://research.microsoft.com/en-us/um/people/chazhang/publications/hot3d11_ChaZhang.pdf.*

Oh et al, Hole Filling Method Using Depth Based In-Painting for View Synthesis in Free Viewpoint Television and 3-D Video, Picture Coding Symposium, 2009.*

S.U. Yoon et al. "A Survey and Trends on 3D Face Reconstruction Technologies" Electronics and TelecommunicationsTrends (2012) (11 pages in Korean with English Summary).

Zhang, Zhengyou. "Flexible camera calibration by viewing a plane from unknown orientations." Computer Vision, 1999. The Proceedings of the Seventh IEEE International Conference on. vol. 1. IEEE, 1999.

Horn, Berthold KP. "Tsai's camera calibration method revisited." Online: http://people.csail.mit.edu/bkph/articles/Tsai_Revisited.pdf (2000).

Dias, Paulo "Tsai Camera Calibration" IEETA/Universidade de Aveiro, Portugal—Online: http://homepages.inf.ed.ac.uk/rbf/CVonline/LOCAL_COPIES/DIAS1/ (2003).

* cited by examiner

3-DIMENSIONAL SHAPE RECONSTRUCTION DEVICE USING DEPTH IMAGE AND COLOR IMAGE AND THE METHOD

CROSS-REFERENCE TO RELATED APPLICATIONS

This application claims the benefit of Korean Patent Application No. 10-2012-0117998, filed on Oct. 23, 2012 and of Korean Patent Application No. 10-2013-0001903 filed on Jan. 8, 2013, in the Korean Intellectual Property Office, the disclosure of which is incorporated herein by reference.

BACKGROUND

1. Field of the Invention

The present invention relates to a 3-dimensional (3D) shape reconstruction device and method, and more particularly, to a 3D shape reconstruction device and method for reconstructing a 3D shape using a depth image and a color image.

2. Description of the Related Art

A shape reconstruction technology refers to a technology for reconstructing a shape from 3-dimensional (3D) appearance information through combination of 3D points or meshes. The shape reconstruction technology may use laser, and a pattern or a passive image. The shape reconstruction technology may be divided into an active method and a passive method according to a reconstruction method or characteristics of a sensor used for reconstruction.

The active method captures a shape by projecting laser or pattern light to an object. That is, the active method photographs a pattern projected to a surface of the object by an image camera at a predetermined distance from a light source. In addition, the active method may determine a 3D position by triangulating the photographed pattern.

The passive method restores shape information of an object using a multi-view image obtained by multi cameras arranged around the object. In detail, the passive method may restore the shape information of the object from the multi-view image using an image based reconstruction method such as stereo or volumetric.

In the following description, a technology for reconstructing a whole shape of a user out of various objects will be suggested. Since, the user is basically dynamic, characteristics of a dynamic object different from a static object that has been dealt in conventional industries need to be taken into consideration.

In case of the active method that projects laser or pattern light to a surface of an object and photographs, reconstruction accuracy may be considerably decreased when different patterns overlap on the surface of the object. Therefore, a relatively long scan time of about 10 seconds or more is necessary to photograph the whole shape and a movement of the user occurring during the scan may directly affect the reconstruct accuracy.

However, different from the active method, the passive method may instantly photograph the whole shape of the user using an industrial camera of a snapshot camera. The passive method, which does not use a particular pattern, captures the user taking various postures or making a continuous motion. However, accuracy of the passive method is lower than accuracy of the active method.

Recently, a sensor provides depth information in real time using a triangulation method based on pattern light in an infrared (IR) area.

Accordingly, there will be introduced a method for obtaining a higher quality result of shape reconstruction by combining data of sensors that simultaneously provide a depth image with a color image.

SUMMARY

An aspect of the present invention provides a 3-dimensional (3D) whole shape reconstruction apparatus achieving high reconstruction accuracy by reconstructing a 3D whole shape of a user by matching shape information of 3D portions generated by depth information and color information.

Another aspect of the present invention provides a 3D whole shape reconstruction apparatus achieving high reconstruction accuracy by acknowledging hole characteristics of shape information of 3D portions according to overlap, by matching the shape information of 3D portions in consideration of movements of the user.

According to an aspect of the present invention, there is provided a 3-dimensional (3D) whole shape reconstruction apparatus including an information generation unit to generate shape information of 3D portions using a depth image and a color image, and a shape reconstruction unit to reconstruct a 3D whole shape of a user by matching the shape information of 3D portions.

The information generation unit may generate the shape information of 3D portions, based on inner silhouette information of the user using the depth image and outer silhouette information of the user using the color image.

The information generation unit may generate the shape information of 3D portions considering characteristics of the depth information and characteristics of the silhouette information of the user, provided by the color image, using a background image.

The information generation unit may extract a particular pixel of the color image not including depth information of the depth image, and estimates depth information corresponding to the particular pixel.

The information generation unit may generate a color edge image and a color boundary image of the user based on the color image.

The information generation unit may generate an alpha mask image with respect to a foreground image including the user, using difference between the color image and a background image.

The information generation unit may generate depth information of the depth image corresponding to a hole of the alpha mask image, by combining the foreground image with the depth image projected to the color image.

The shape reconstruction unit may reconstruct the 3D whole shape using shape patch information generated based on the shape information of 3D portions.

The shape patch information may be generated by converting a local coordinate expressing the shape information of 3D portions into a global coordinate.

The shape reconstruction unit may reconstruct the 3D whole shape by elliptically modeling the shape patch information and matching the shape patch information with respect to an elliptical model of particular shape patch information according to a movement of the user.

According to another aspect of the present invention, there is provided a 3D whole shape reconstruction method including generating shape information of 3D portions using a depth image and a color image, and reconstructing a 3D whole shape of a user by matching the shape information of 3D portions.

The generating may include generating the shape information of 3D portions, based on inner silhouette information of the user using the depth image and outer silhouette information of the user using the color image.

The generating may include generating the shape information of 3D portions considering characteristics of the depth information and characteristics of the silhouette information of the user, provided by the color image, using a background image.

The generating may include extracting a particular pixel of the color image not including depth information of the depth image, and estimating depth information corresponding to the particular pixel.

The generating may include generating a color edge image and a color boundary image of the user based on the color image.

The generating may include generating an alpha mask image with respect to a foreground image including the user, using difference between the color image and a background image.

The generating may include generating depth information of the depth image corresponding to a hole of the alpha mask image, by combining the foreground image with the depth image projected to the color image.

The reconstructing may include reconstructing the 3D whole shape using shape patch information generated based on the shape information of 3D portions.

The shape patch information may be generated by converting a local coordinate expressing the shape information of 3D portions into a global coordinate.

The reconstructing may include reconstructing the 3D whole shape by elliptically modeling the shape patch information and matching the shape patch information with respect to an elliptical model of particular shape patch information according to a movement of the user.

EFFECT

According to embodiments of the present invention, a 3-dimensional (3D) whole shape reconstruction apparatus reconstructs a whole shape of a user by matching shape information of 3D portions, generated using depth information and color information. Therefore, reconstruction accuracy may be relatively high.

Additionally, according to embodiments of the present invention, the 3D whole shape reconstruct apparatus matches the 3D shape information of 3D portions in consideration of a movement of the user. Accordingly, since hole characteristics of the shape information according to overlap may be acknowledged, relatively high reconstruction accuracy may be achieved.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout.

Figure 1:
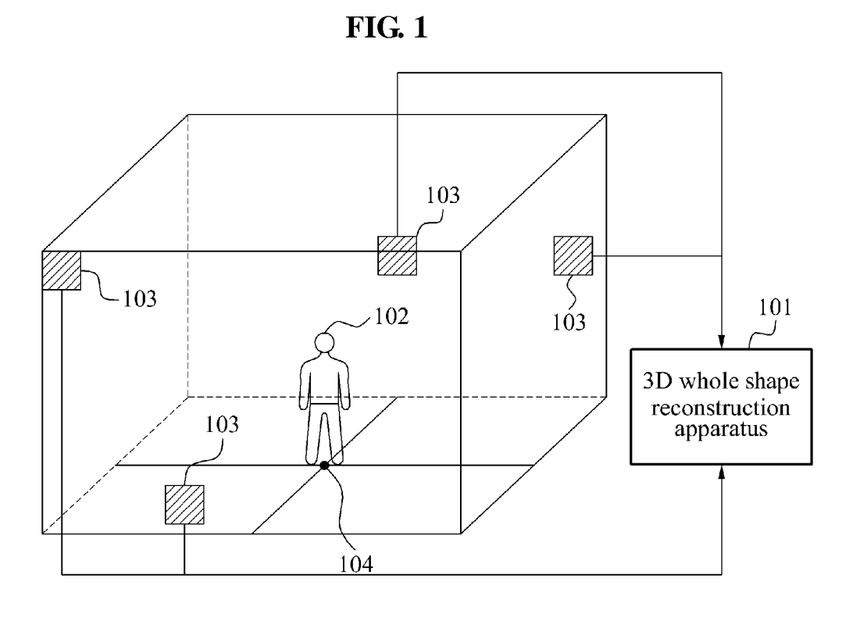
FIG. 1 is a diagram illustrating a 3-dimensional (3D) whole shape reconstruction apparatus according to an embodiment of the present invention.

FIG. 1 is a diagram illustrating a 3-dimensional (3D) whole shape reconstruction apparatus 101 according to an embodiment of the present invention.

Referring to FIG. 1, the 3D whole shape reconstruction apparatus 101 may receive a depth image and a color image of a user 102 from a sensor 103. A plurality of sensors 103 may be used. The sensor 103 may obtain the depth image and the color image in relation to a particular portion of the user 102 at a predetermined distance from the user.

Also, the 3D whole shape reconstruction apparatus 101 may obtain depth images and color images of a front side and a rear side of the user 102 simultaneously. Therefore, an overlap by mismatch of images, caused by a movement of the user 102, may be minimized. This will be described in detail with reference to FIG. 7.

A center of the user 102 may be a central point of a location of the user 102, that is, a global coordinate 104. The sensor 103 may obtain the depth image and the color depth, simultaneously. For example, the sensor 103 may include a depth camera for obtaining the depth image and a color camera for obtaining the color image. Also, the sensor 103 may include a local coordinate with respect to the depth camera and the color camera included in the sensor 103.

The user 102 may be located on the global coordinate for 3D whole shape reconstruction. The global coordinate may be generated with reference to the location of the user 102. The sensor 103 may perform geometric correction between the global coordinate and the local coordinate with reference to the user 102.

The 3D whole shape reconstruction apparatus 101 may generate shape information of 3D portions using the depth image and the color image being obtained. Additionally, the 3D whole shape reconstruction apparatus 101 may reconstruct a 3D whole shape based on the shape information of 3D portions. In detail, the 3D whole shape reconstruction apparatus 101 may generate shape patch information based on the shape information of 3D portions, and may elliptically model the shape patch information. The 3D whole shape reconstruction apparatus 101 may match the shape patch information with respect to an elliptical model of particular shape patch information according to a movement of the user 102, thereby reconstructing the 3D whole shape.

Since the 3D whole shape reconstruction apparatus 101 reconstructs the 3D whole shape of the user 102 by matching the shape information of 3D portions generated using depth information and color information, reconstruction accuracy of the 3D whole shape reconstruction apparatus 101 may be relatively high.

In addition, the 3D whole shape reconstruction apparatus 101 accurately recognize hole characteristics of the shape information of 3D portions according to the overlap, by matching the shape information of 3D portions in consideration of the movement of the user 102.

Figure 2:
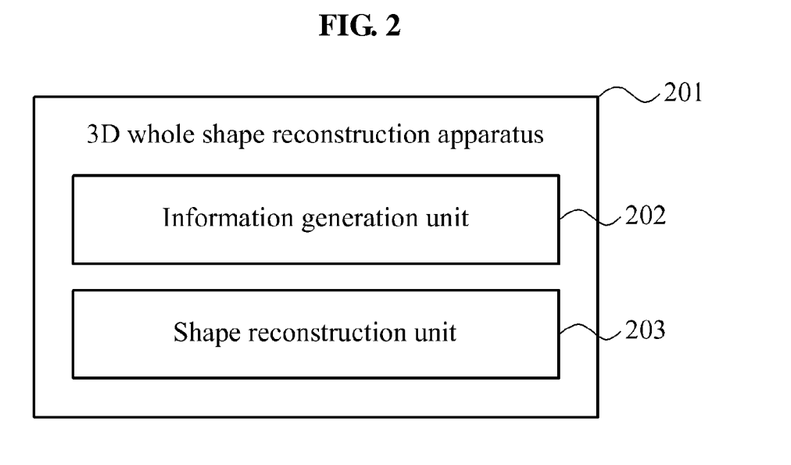
FIG. 2 is a diagram illustrating a detailed structure of a 3D whole shape reconstruction apparatus, according to an embodiment of the present invention.

FIG. 2 is a diagram illustrating a detailed structure of a 3D whole shape reconstruction apparatus 301, according to an embodiment of the present invention.

Referring to FIG. 2, the 3D whole shape reconstruction apparatus 301 may include an information generation unit 202 and a shape reconstruction unit 203.

The information generation unit 202 may generate shape information of 3D portions using a depth image and a color image. In detail, the information generation unit 202 may use inner silhouette information of a user using the depth image and outer silhouette information of the user using the color image. The inner silhouette information may include shape information of the user according to the depth image of a depth camera. The outer silhouette information may include silhouette information of the user according to the color image of a color camera. In addition, the outer silhouette information may include information that a user or an object is not present in an outer space of a silhouette. A related description will be made in further detail with reference to FIG. 4.

The information generation unit 202 may generate the shape information of 3D portions based on the inner silhouette information and the outer silhouette information. Additionally, the information generation unit 202 may generate the shape information of 3D portion using a background image. That is, the information generation unit 202 may use the background image to recognize absence of the depth image, generated according to characteristics of the silhouette information of the user provided by the depth image and the color image. Here, the background image may be an image of a background taken before the depth image and the color image according to portions of the user are obtained. Therefore, the information generation unit 202 may generate the shape information of 3D portions using the background image, the shape information of 3D portions considering characteristics of the depth information and characteristics of the silhouette information of the user provided by the color image.

In addition, the information generation unit 202 may generate a color edge image and a color boundary image of the user based on the color image. Furthermore, the information generation unit 202 may generate an alpha mask image with respect to a foreground image including the user, using difference between the color image and the background image. The information generation unit 202 may generate the depth information of the depth image corresponding to a hole of the alpha mask image, by combining the foreground image with the depth image projected to the color image.

Through the foregoing process, the information generation unit 202 may generate the shape information of 3D portions of the user. However, the process of generating the shape information of 3D portions is not limited to the foregoing description.

The shape reconstruction unit 203 may generate the shape patch information based on the shape information of 3D portions. The shape reconstruction unit 203 may reconstruct the 3D whole shape using the shape patch information. The shape patch information may be generated by converting the local coordinate expressing the shape information of 3D portions into the global coordinate. The shape patch information may include different global coordinates according to the movement of the user.

In addition, the shape reconstruction unit 203 may elliptically model the shape patch information. The shape reconstruction unit 203 may match the shape patch information with respect to an elliptical model of particular shape patch information. That is, the shape reconstruction unit 203 may mach the shape patch information with respect to the elliptical model of shape patch information generated by an initially obtained depth image and color image, out of the shape patch information. In addition, the shape reconstruction unit 203 may reconstruct the 3D whole shape by matching the shape patch information.

Figure 3:
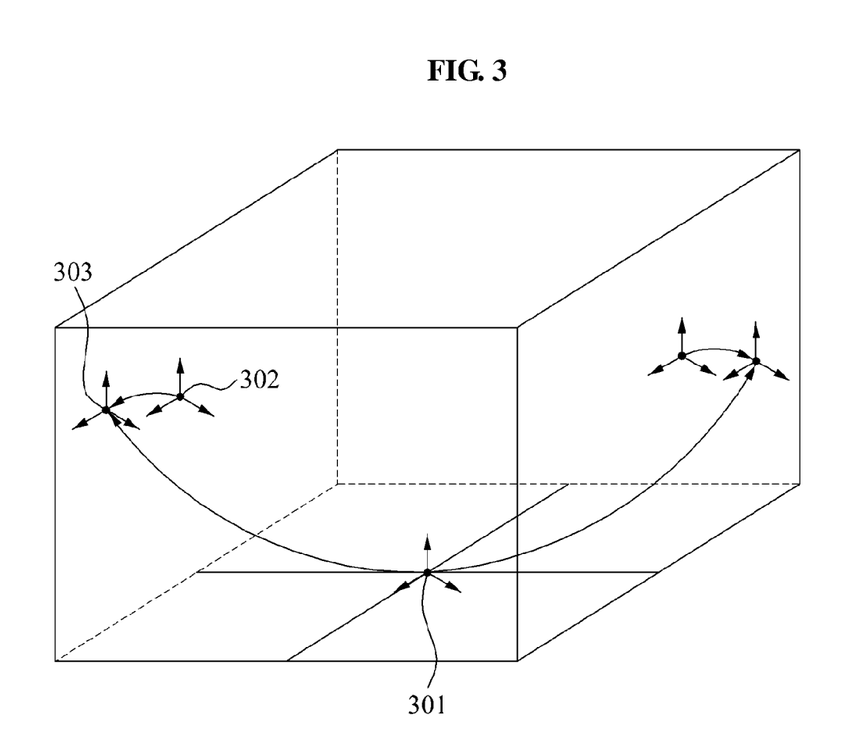
FIG. 3 is a diagram illustrating geometric correction relations between a local coordinate and a global coordinate, according to an embodiment of the present invention.

FIG. 3 is a diagram illustrating geometric correction relations between a local coordinate and a global coordinate, according to an embodiment of the present invention.

Referring to FIG. 3, geometric correction relations between a global coordinate 301, and a depth camera 302 and a color camera 303 of a sensor.

The sensor may obtain a depth image and a color image. That is, the sensor may include the depth camera 302 and the color camera 303. The sensor may include a local coordinate with respect to the depth camera 302 and the color camera 303.

The depth camera 302 and the color camera 303 may be in geometric correction relations with each other. The geometric correction relations may be calculated based on correction information related to geometric correction. For example, the sensor may perform geometric correction using various methods such as a method by Zhengzhou Zang or a method by Tsai.

The sensor may reconstruct the 3D whole shape of the user by integrating the shape information of 3D portions of the user with the global coordinate 301 through the geometric correction.

Figure 4:
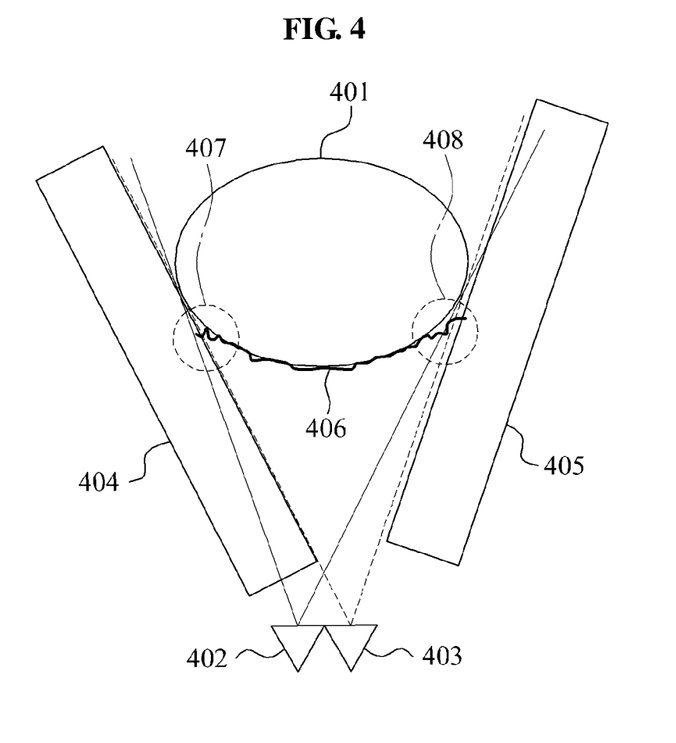
FIG. 4 is a diagram illustrating inner silhouette information and outer silhouette information, according to an embodiment of the present invention.

FIG. 4 is a diagram illustrating inner silhouette information and outer silhouette information, according to an embodiment of the present invention.

Referring to FIG. 4, the 3D whole shape reconstruction apparatus may generate shape information of 3D portions using a depth image and a color image. In further detail, the 3D whole shape reconstruction apparatus may obtain inner silhouette information of a user 401 through the depth image of a depth camera 402, and obtain outer silhouette information of the user 401 through the color image of a color camera 403.

The outer silhouette information obtained from the color image of the color camera 403 may include silhouette information of the user 401. The outer silhouette information may include information that the user 401 or an object is not present in spaces 404 and 405. The outer silhouette information may not include inner silhouette information related to shape information 406 of the user 401.

The inner silhouette information obtained from the depth image of the depth camera 402 may include the shape information of the user 401. That is, the inner silhouette information may include the shape information 406 which is not included in the outer silhouette information.

Here, holes 407 and 408 of depth information may be generated according to characteristics of the depth camera 402. The 3D whole shape reconstruction apparatus may recognize valid values of the holes 407 and 408, using the holes 407 and 408 of the depth information and a background image. Here, the valid value may refer to an estimated value to be used as depth information corresponding to a hole, that is, an error or absence of the depth information generated at a silhouette boundary. Generation of the holes 407 and 408 may mean that the depth information is not obtained or an error is generated in the depth information when a shape of the user forms an angle with respect to the depth camera and therefore the shape of the user is not normally projected. Also, the holes 407 and 408 may be generated intermittently due to an overlap of patterns between depth sensors or due to characteristics of the depth sensor.

The holes 407 and 408 of the depth information may also be generated during geometric correction between the color camera 403 and the depth camera 402. In detail, the holes 407 and 408 may be generated when the depth information is not provided with respect to a boundary of the shape information 405 of the user 401 or when the error in the depth information occurs, during conversion of the depth information into the local coordinate of the color camera.

Therefore, the 3D whole shape reconstruction apparatus may obtain the valid values of the holes 407 and 408 of the depth information, using the background image obtained before reconstruction of the 3D whole shape of the user. That is, the background image may be used to consider characteristics of the depth information and utilize characteristics provided by the shape information 406 of the user 401, the shape information 406 provided by the color image.

Figure 5:
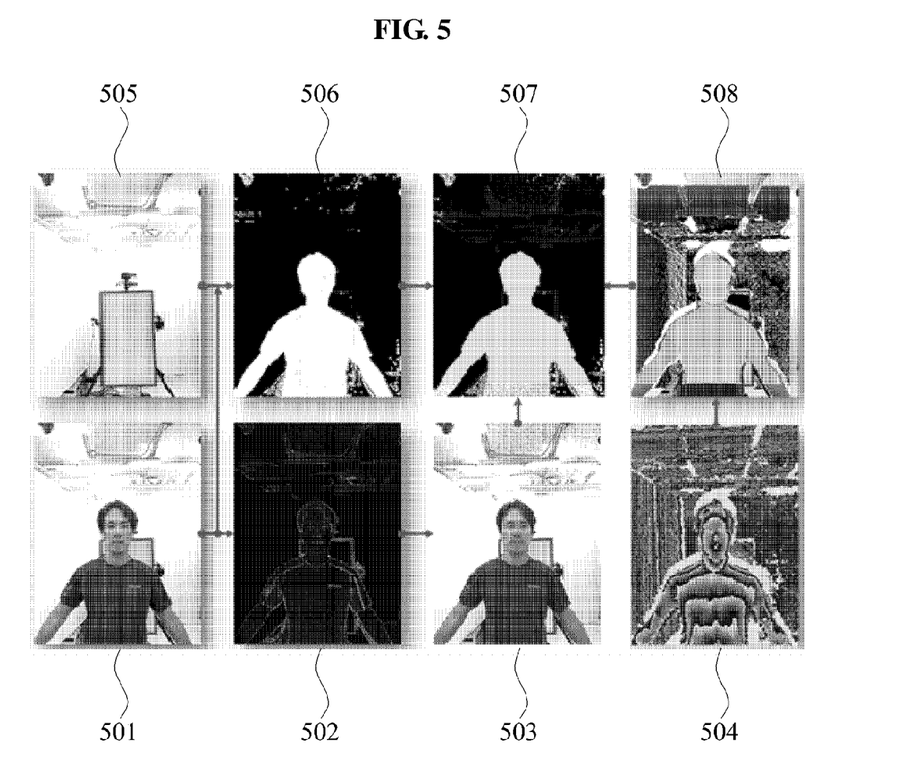
FIG. 5 is a diagram illustrating data preprocessing process of a depth image and a color image, according to an embodiment of the present invention.

FIG. 5 is a diagram illustrating data preprocessing process of a depth image and a color image, according to an embodiment of the present invention.

Referring to FIG. 5, the 3D whole shape reconstruction apparatus may combine a color image 501, a depth image 504, and a geometrically corrected depth image 508.

The 3D whole shape reconstruction apparatus may obtain a color edge image 502 using the color image 501, and also obtain a color boundary image 503 through non-maximal suppression of the color edge image 502.

The 3D whole shape reconstruction apparatus may obtain a foreground image 506 of the user, the foreground image 506 including the user, using difference between the color image 501 and a background image 505. The 3D whole shape reconstruction apparatus may obtain an alpha mask image 507 with respect to the foreground image 506. The alpha mask image 507 may have a value of [0, 255] according to a color difference between the foreground image 506 and the background image 505. Here, 255 refers to a pixel of a foreground area, for example a person, and 0 refers to a pixel of a background area. Values between 0 and 255 may express probability values of the foreground area by scale values. In addition, the 3D whole shape reconstruction apparatus may project the depth image 504 to the color image 501 using geometric correction information of the depth image 504. Accordingly, the 3D whole shape reconstruction apparatus may obtain the geometrically corrected depth image 508 expressed in a color camera.

In addition, the 3D whole shape reconstruction apparatus may combine information of the foreground image 506 with the color boundary image 503. Accordingly, the 3D whole shape reconstruction apparatus may obtain shape information related to a more accurate silhouette of the user and information related to a foreground region of the user.

Also, the 3D whole shape reconstruction apparatus may combine the foreground image 506 with the alpha mask image 507, thereby obtaining information on the geometrically corrected depth image 508 according to a hole of an alpha mask. That is, the 3D whole shape reconstruction apparatus may obtain the information on the geometrically corrected depth image 508 with respect to the hole of the alpha mask, generated corresponding to a color of the background image 505 out of colors of a surface of the silhouette of the user. The holes of the geometrically corrected depth image 508 generated due to characteristics of the aforementioned depth sensor may be provided as information on the alpha mask.

The 3D whole shape reconstruction apparatus may solve absence of information on a particular pixel in an image, caused due to an image processing error or a sensor error, by using complementary information with respect to the hole generated during reconstruction of the 3D whole shape.

Figure 6:
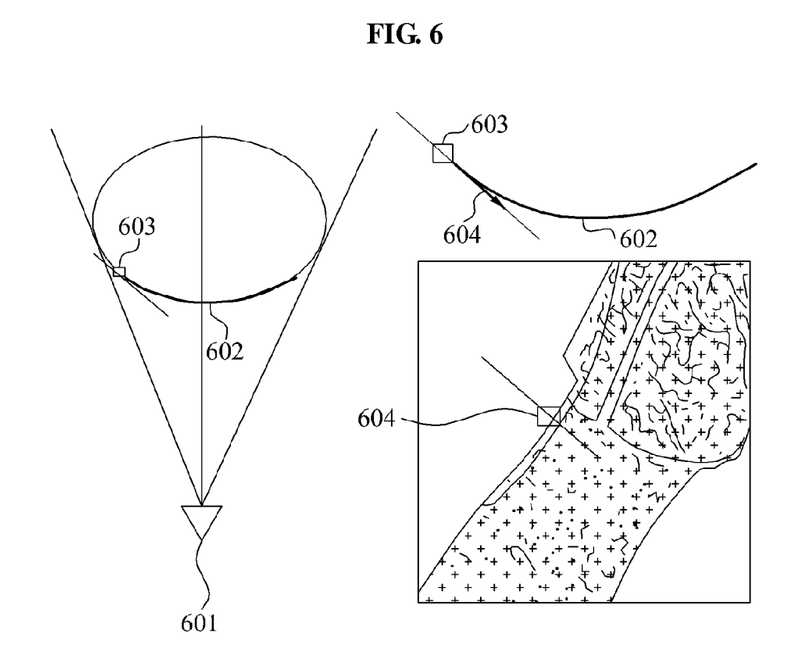
FIG. 6 is a diagram illustrating a depth information estimation process of a particular pixel in which depth information is missing, according to an embodiment of the present invention.

FIG. 6 is a diagram illustrating a depth information estimation process of a particular pixel in which depth information is missing, according to an embodiment of the present invention.

Referring to FIG. 6, the 3D whole shape reconstruction apparatus may correct or add depth information with respect to the hole of the depth information according to the characteristics of the depth camera, using valid depth information. Here, the 3D whole shape reconstruction apparatus may use depth information projected to a color camera 601.

The 3D whole shape reconstruction apparatus may filter depth information rapidly changing at the boundary of the silhouette using shape information 602 of the user. The 3D whole shape reconstruction apparatus may extract a particular pixel 603 of a color image which does not include the depth information, from the boundary of the silhouette at which the depth information is filtered. The 3D whole shape reconstruction apparatus may track pixels which are adjacent to the particular pixel 603 and include valid depth information. Additionally, the 3D whole shape reconstruction apparatus may estimate depth information of the particular pixel 603, using depth information of a pixel 604 orthogonal to the boundary of the silhouette among tracked pixels. That is, the 3D whole shape reconstruction apparatus may calculate curvature information with respect to the depth information of the orthogonal pixel 604 and estimate the depth information of the particular pixel 603 in consideration of the calculation result. Accordingly, the depth information of the particular pixel 603 may be corrected or added.

Therefore, the 3D whole shape reconstruction apparatus may correct the hole of the depth information according to the characteristics of the depth information of the depth image and the characteristics of silhouette information of an object provided by the color image. As a result, shape information of 3D portions of the user may be obtained with high reliability.

Figure 7:
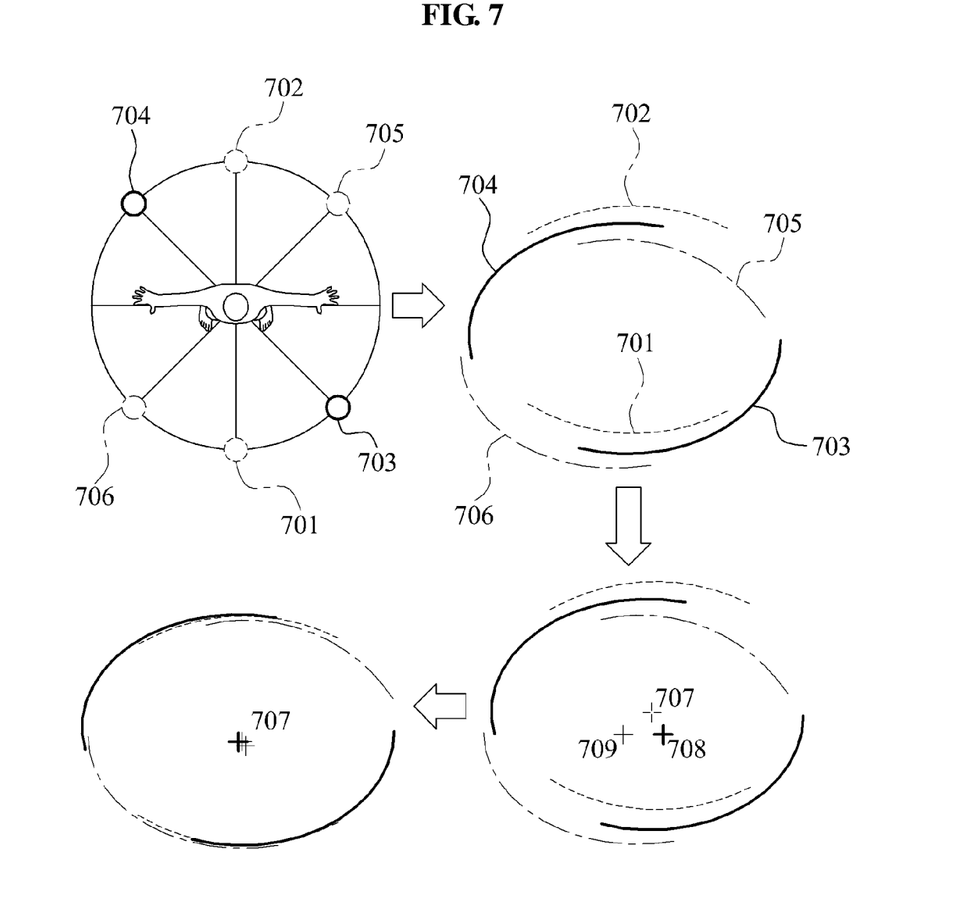
FIG. 7 is a diagram illustrating a process of matching shape patch information, according to an embodiment of the present invention.

FIG. 7 is a diagram illustrating a process of matching shape patch information, according to an embodiment of the present invention.

Referring to FIG. 7, the 3D whole shape reconstruction apparatus may reconstruct the 3D whole shape of the user by converting the shape information of 3D portions of the user into a global coordinate.

The 3D whole shape reconstruction apparatus may simultaneously obtain shape patch information according to a depth image and a color image of a front side 701 and a rear side 702 of the user. In detail, the 3D whole shape reconstruction apparatus may obtain the shape patch information of the front side 701 and the rear side 702 by simultaneously projecting the front side 701 and the rear side 702 with respect to the user according to characteristics of the depth sensor. When the shape patch information is obtained in the foregoing manner, mismatch between the shape patch information may not be generated by the movement of the user. That is, the shape patch information obtained from the front side 710 and the rear side 702 may not be affected by the movement of the user.

Therefore, the 3D whole shape reconstruction apparatus may obtain the shape patch information at predetermined time intervals by grouping facing sensors. For example, the sensors may be grouped into sensors disposed at the front side 701 and the rear side 702, sensors disposed at a front side 703 and a rear side 704, and sensors disposed at a front side 706 and a rear side 705. Here, the terms 'front side' and 'rear side' are not to be limited to the meanings used herein to describe the embodiment of the present invention.

In addition, the 3D whole shape reconstruction apparatus may elliptically model the shape patch information obtained in groups, thereby estimating mismatch information between the shape patch information. The elliptically modeled shape patch information may include centers 707, 708, and 709 of different elliptical models according to the group. In addition, the 3D whole shape reconstruction apparatus may solve the mismatch by moving the centers 707, 708, and 709 of the elliptical models to one center according to the movement of the user. For example, the 3D whole shape reconstruction apparatus may move the centers 707 and 708 of the different elliptical models to the center 707 of the elliptical model corresponding to the group of the shape patch information initially obtained.

Accordingly, the 3D whole shape reconstruction apparatus may reconstruct the 3D whole shape according to the movement of the user using the shape information of 3D portions.

Figure 8:
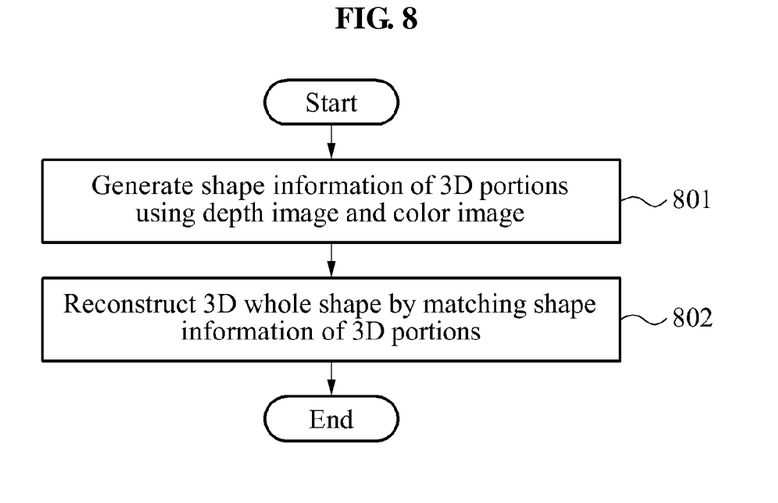
FIG. 8 is a diagram illustrating a 3D whole shape reconstruction method according to an embodiment of the present invention.

In operation 801, a 3D whole shape reconstruction apparatus may generate shape information of 3D portions using a depth image and a color image. In detail, the 3D whole shape reconstruction apparatus may use inner silhouette information of the user using the depth image and outer silhouette information of the user using the color image. The 3D whole shape reconstruction apparatus may generate the shape information of 3D portions based on the inner silhouette information and the outer silhouette information. The 3D whole shape reconstruction apparatus may also use a background image to generate the shape information of 3D portions. That is, the 3D whole shape reconstruction apparatus may use the background image to recognize absence of the depth image, generated according to characteristics of the silhouette information of the user provided by the depth image and the color image. Here, the background image may be an image of a background taken before the depth image and the color image according to portions of the user are obtained. Therefore, the 3D whole shape reconstruction apparatus may generate the shape information of 3D portions using the background image, the shape information of 3D portions considering characteristics of the depth information and characteristics of the silhouette information of the user provided by the color image.

The 3D whole shape reconstruction apparatus may generate a color edge image and a color boundary image of the user based on the color image. Furthermore, the 3D whole shape reconstruction apparatus may generate an alpha mask image with respect to a foreground image including the user, using difference between the color image and the background image. The 3D whole shape reconstruction apparatus may generate the depth information of the depth image corresponding to a hole of the alpha mask image, by combining the foreground image with the depth image projected to the color image.

In operation 802, the 3D whole shape reconstruction apparatus may generate shape patch information based on the shape information of 3D portions. The 3D whole shape reconstruction apparatus may reconstruct the 3D whole shape using the shape patch information. The shape patch information may be generated by converting a local coordinate expressing the shape information of 3D portions into a global coordinate. The shape patch information may include different global coordinates according to the movement of the user.

In addition, the 3D whole shape reconstruction apparatus may elliptically model the shape patch information. The 3D whole shape reconstruction apparatus may match the shape patch information with respect to an elliptical model of particular shape patch information according to the movement of the user. That is, the 3D whole shape reconstruction apparatus may match the shape patch information with respect to the elliptical model of the shape patch information generated by an initially obtained depth image and color image, out of the shape patch information. In addition, the 3D whole shape reconstruction apparatus may reconstruct the 3D whole shape by matching the shape patch information.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A 3-dimensional (3D) whole shape reconstruction apparatus comprising:
   at least a computer configured to:
   generate shape information of 3D portions based on inner silhouette information of a user using a depth image and outer silhouette information of the user using a color image;
   reconstruct a 3D whole shape of the user by matching the shape information of 3D portions; and
   correct or add depth information generated at a silhouette boundary of the depth image, by:
   generating an alpha mask image with respect to a foreground image including the user, using a color difference between the foreground image and the background image,
   generating a geometrically corrected depth image by projecting the depth image to the color image using geometric correction information of the depth image, and
   obtaining the depth information on the geometrically corrected depth image corresponding to a hole of the alpha mask image by combining the foreground image with the alpha mask image.

2. The 3D whole shape reconstruction apparatus of claim 1, wherein the computer is further configured to use a background image to generate shape information of the 3D portions.

3. The 3D whole shape reconstruction apparatus of claim 1, wherein the computer is further configured to generate the shape information of 3D portions considering characteristics of the depth information and characteristics of the outer silhouette information of the user, provided by the color image, using a background image.

4. The 3D whole shape reconstruction apparatus of claim 1, wherein the computer is further configured to extract a particular pixel of the color image not including depth information, and to estimates depth information corresponding to the particular pixel.

5. The 3D whole shape reconstruction apparatus of claim 1, wherein the computer is further configured to generate a color edge image and a color boundary image of the user based on the color image.

6. The 3D whole shape reconstruction apparatus of claim 1, wherein the computer is further configured to reconstruct the 3D whole shape using shape patch information generated based on the shape information of 3D portions.

7. The 3D whole shape reconstruction apparatus of claim 6, wherein the shape patch information is generated by converting a local coordinate expressing the shape information of 3D portions into a global coordinate.

8. The 3D whole shape reconstruction apparatus of claim 6, wherein the computer is further configured to reconstruct the 3D whole shape by elliptically modeling the shape patch information and matching the shape patch information with respect to an elliptical model of particular shape patch information according to a movement of the user.

9. A 3-dimensional (3D) whole shape reconstruction method comprising:
  generating shape information of 3D portions based on inner silhouette information of a user using a depth image and outer silhouette information of the user using a color image;
  reconstructing a 3D whole shape of the user by matching the shape information of 3D portions;
  correcting or adding depth information generated at a silhouette boundary of the depth image; and
  wherein the correcting or adding of the depth information comprises:
    generating an alpha mask image with respect to a foreground image including the user, using a color difference between the foreground image and the background image,
    generating a geometrically corrected depth image by projecting the depth image to the color image using geometric correction information of the depth image, and
    obtaining the depth information on the geometrically corrected depth image corresponding to a hole of the alpha mask image by combining the foreground image with the alpha mask image.

10. The 3D whole shape reconstruction method of claim 9, wherein the generating comprises using a background image to generate shape information of the 3D portions.

11. The 3D whole shape reconstruction method of claim 9, wherein the generating comprises generating the shape information of 3D portions considering characteristics of the depth information and characteristics of the outer silhouette information of the user, provided by the color image, using a background image.

12. The 3D whole shape reconstruction method of claim 9, wherein the generating comprises extracting a particular pixel of the color image not including depth information of the depth image, and estimating depth information corresponding to the particular pixel.

13. The 3D whole shape reconstruction method of claim 9, wherein the generating comprises generating a color edge image and a color boundary image of the user based on the color image.

14. The 3D whole shape reconstruction method of claim 9, wherein the reconstructing comprises reconstructing the 3D whole shape using shape patch information generated based on the shape information of 3D portions.

15. The 3D whole shape reconstruction method of claim 14, wherein the shape patch information is generated by converting a local coordinate expressing the shape information of 3D portions into a global coordinate.

16. The 3D whole shape reconstruction method of claim 14, wherein the reconstructing comprises reconstructing the 3D whole shape by elliptically modeling the shape patch information and matching the shape patch information with respect to an elliptical model of particular shape patch information according to a movement of the user.

* * * * *